US011743330B1

(12) United States Patent
Gilbert et al.

(10) Patent No.: US 11,743,330 B1
(45) Date of Patent: Aug. 29, 2023

(54) BACKGROUND UPGRADE MIGRATION DETERMINATION AND IMPLEMENTATION

(71) Applicant: Microsoft Technology Licensing, LLC, Redmond, WA (US)

(72) Inventors: Robert Bradley Gilbert, Kirkland, WA (US); Alison Rachel Wu, Redmond, WA (US); Aamir Rasheed, Lake Forest Park, WA (US); Prakhar Srivastava, Seattle, WA (US); Doru Kesriyeli, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/942,781

(22) Filed: Sep. 12, 2022

(51) Int. Cl.
*H04L 67/1095* (2022.01)
*G06F 8/65* (2018.01)
*H04L 67/306* (2022.01)

(52) U.S. Cl.
CPC ............ *H04L 67/1095* (2013.01); *G06F 8/65* (2013.01); *H04L 67/306* (2013.01)

(58) Field of Classification Search
None
See application file for complete search history.

(56) References Cited

U.S. PATENT DOCUMENTS

2020/0019393 A1* 1/2020 Vichare ................... G06N 20/00
2020/0034133 A1* 1/2020 Dattatri .................... G06F 8/61
2021/0319894 A1* 10/2021 Sobol ........................ G06N 7/01

OTHER PUBLICATIONS

Samir et al., "Age of Information Aware Trajectory Planning of UAVs in Intelligent Transportation Systems: A Deep Learning Approach", Dec. 18, 2020, IEEE, IEEE Transactions on Vehicular Technology (vol. 69, Issue: 11, pp. 12382-12395) (Year: 2020).*
"Apple, Google and Microsoft Commit to Expanded Support for FIDO Standard to Accelerate Availability of Passwordless Sign-Ins", Retrieved from: https://fidoalliance.org/apple-google-and-microsoft-commit-to-expanded-support-for-fido-standard-to-accelerate-availability-of-passwordless-sign-ins/. May 5, 2022, 4 Pages.
"LoadUserProfileA function (userenv.h)", Retrieved from: https://docs.microsoft.com/en-us/windows/win32/api/userenv/nf-userenv-loaduserprofilea, Jul. 28, 2022, 5 Pages.
"UnloadUserProfile function (userenv.h)", Retrieved from: https://docs.microsoft.com/en-us/windows/win32/api/userenv/nf-userenv-unloaduserprofile, Oct. 13, 2021, 4 Pages.

(Continued)

*Primary Examiner* — Davoud A Zand
(74) *Attorney, Agent, or Firm* — Holzer Patel Drennan

(57) ABSTRACT

Migration of a user of a computing device to accept an updated version of a software feature to the exclusion of a prior version of the software feature is implemented without user friction. Telemetry data corresponding to use of the updated version and of the prior version is stored. The telemetry data is evaluated utilizing a trained machine learning model trained using external telemetry data with respect to use of the updated version and to use of the prior version. A migration acceptance value indicative of whether the user will accept use of the updated version to exclusion of the prior version is calculated. The migration acceptance value is compared to a threshold value determined by the trained model. If the migration acceptance value exceeds the threshold value, the prior version is excluded from the user profile.

20 Claims, 5 Drawing Sheets

(56) References Cited

OTHER PUBLICATIONS

Czechowski, et al., "Password-less strategy", Retrieved from: https://docs.microsoft.com/en-us/windows/security/identity-protection/hello-for-business/passwordless-strategy, Jul. 13, 2022, 23 Pages.

Ehrensvard, Stina, "A new White House directive: Phishing resistance!", Retrieved from: https://www.yubico.com/blog/a-new-white-house-directive-phishing-resistance/, Oct. 27, 2021, 7 Pages.

Hudek, et al., "Enable and disable the built-in administrator account", Retrieved from: https://docs.microsoft.com/en-US/windows-hardware/manufacture/desktop/enable-and-disable-the-built-in-administrator-account?view=windows-11, Oct. 1, 2021, 5 Pages.

Radich, et al., "Windows Information Protection (WIP)", Retrieved from: https://docs.microsoft.com/en-us/windows/uwp/enterprise/wip-hub, Jan. 25, 2022, 5 Pages.

Walker, et al., "About User Profiles", Retrieved from: https://docs.microsoft.com/en-us/windows/win32/shell/about-user-profiles, Aug. 26, 2021, 5 Pages.

White, et al., "Principal.RunLevel property", Retrieved from: https://docs.microsoft.com/en-us/windows/win32/taskschd/principal-runlevel, Dec. 12, 2020, 3 Pages.

White, et al., "Security Contexts for Tasks", Retrieved from: https://docs.microsoft.com/en-us/windows/win32/taskschd/security-contexts-for-running-tasks, Feb. 21, 2020, 6 pages.

\* cited by examiner

BACKGROUND UPGRADE MIGRATION DETERMINATION AND IMPLEMENTATION

BACKGROUND

Computer operating systems and applications are often upgraded, often with goals of providing better functionality and ease of use for the user, increased security, or better computer performance, for example. Sometimes, however, a user is familiar with an older interface, process, or workflow, and a jarring change to an application or operating system interface can be a difficult adjustment and productivity may be compromised. While options may be available to adjust settings to return to prior familiar environments, some users are unaware of these options or do not understand how to navigate through preference settings to adjust their computer environment to return to a more familiar experience.

SUMMARY

In an example implementation, a method of migrating a user profile of a computing device to an updated version of a software feature to exclusion of a prior version of the software feature includes the following operations. Telemetry data corresponding to use of the updated version of the software feature and to use of the prior version of the software feature is stored. The telemetry data is evaluated utilizing a trained machine learning model trained using external telemetry data with respect to use of the updated version of the software feature and to use of the prior version of the software feature. Based, at least in part, upon the evaluating of the telemetry data utilizing the trained machine learning model, a migration acceptance value of the user profile is calculated. The migration acceptance value is compared to a threshold value determined by the trained machine learning model. Responsive to the migration acceptance value exceeding the threshold value, the prior version of the software feature is excluded from use by the user profile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The disclosure will be readily understood by the following detailed description in conjunction with the accompanying drawings.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Figure 1A:
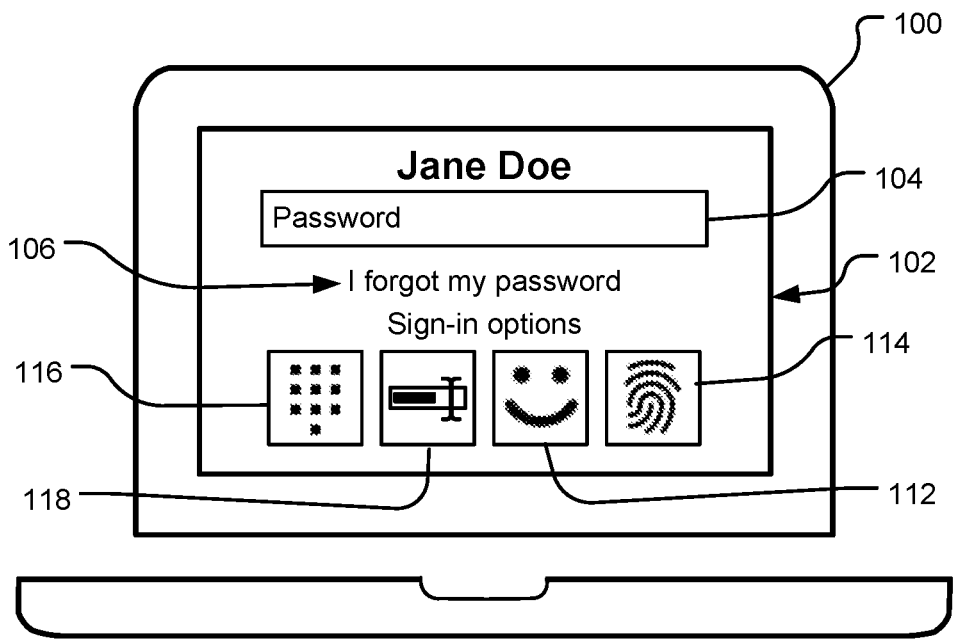
FIG. 1A presents a schematic illustration of an example graphical user interface with a presentation of sign-in options.

Updates to computer applications and operating systems can sometimes cause consternation to users, particularly when well-known features or workflows are changed. Sometimes, users do not immediately recognize, appreciate, or understand benefits of the feature changes accompanying an update and prefer to maintain a prior feature or the look and feel of a prior environment. Depending upon how a software developer chooses to implement an update or upgrade, options are sometimes provided that allow a user to continue to use or revert the computing environment to present the prior incarnation of a feature or environment for continued use. Typically, however, such options for reverting or selecting the form of features are often only accessible by navigating through detailed preferences or settings menus to find the feature of interest. Some users are unaware that such preference options are available at all. Other users find it difficult to navigate through large numbers of settings or preferences to identify and changes a feature of interest. For these types of users, adopting change is difficult and managing options associated with such features changes is very difficult and can result in significant frustration.

In some situations, it may be desirable to promote migration by the user to ultimately use the updated or upgraded feature or interface. For example, some upgraded features provide for greater security of the user's computing environment. However, prior features may provide generally adequate security, so forcing a migration to use of the updated features need not be a mandatory change in the application or operating system, particularly if such a change, if forced on users, would potentially or likely result in a negative response for some users. Similarly, if an adoption of an upgraded feature results in performance improvement in computers, but operation of the computer is adequate without adoption of the feature, then forced implementation of such a feature may be avoided. Instead, the updated feature can be presented as an option for consideration or trial. If, over time, it is determined that the user has tried and is actually using the optional feature upgrade more often than not, or has not used the prior version of the feature for a certain period of time, then it may be useful to fully migrate the user to the new feature implementation by automatically removing the option to choose between old and new feature implementations after a period of time and appropriate use patterns. Alternatively, if the user continues to select the prior implementation of the feature, then it may be appropriate to maintain the prior implementation option for selection by the user.

The following example is presented to help illustrate the concepts described above in conjunction with FIGS. 1A-2B. In this example, a software developer wants to encourage computer users to migrate to a new, more secure, sign-on or log-in procedure for accessing computing devices, for example, an updated operating system that includes the new, more secure, sign-on protocol. Traditionally, computer users are challenged to enter a valid alpha-numeric-symbol password to access a computing device. More recently, biometric identification options, e.g., facial recognition and fingerprint recognition, have become available for sign-on identification of users to access a computing device. These methods are considered more secure because the user must physically be present for a biometric scan to unlock the computing device.

An additional, more secure, sign-on option is the use of a personal identification number (PIN) (e.g., a 4-6 digit number). A PIN only unlocks the computing device on which it is physically configured. In some implementations, the PIN serves as a user gesture (just like face or fingerprint biometrics). The PIN is not synchronized with any remote services, e.g., file storage services accessed over the Internet (e.g., "cloud storage" such as Microsoft® OneDrive™ or Google® Drive) or software-as-a-service (SAAS) platforms (e.g., Microsoft® 365 or Google® Workspace). A PIN is encrypted and stored on a secure, cryptographic processing chip (e.g., a Trusted Platform Module (TPM)) on the computing device. When the correct PIN is entered, the number or gesture unlocks access to a private key stored in the TPM and the TPM chip sends an encrypted authentication key to log the user into a remote account. The PIN is never transmitted online; it never leaves the particular computing device. Thus, a PIN can only be used by someone with physical possession of the computing device, which provides a significant security advantage. For example, if malware on a computing device monitors keystrokes and sends them to a bad actor in a remote location, the bad actor may learn the PIN, but cannot do anything with it because he does not have physical possession of the computing device. Through reliance on asymmetric key cryptography, traditional shortcomings of passwords, such as phishing, replay, and server breach may be mitigated.

Continuing with the example of desired log-in migration, FIG. 1A presents a common lock-screen graphical user interface 102 for sign-on to a desktop or laptop computing device 100. In this example, the user, Jane Doe, has upgraded the operating system software for the computing device 100. Upon starting the computing device 100, she is presented with a typical password entry field 104 on the graphical user interface 102 with a prompt to enter her password. This may be the sign-in option she is most familiar with based upon options available in the prior version of the operating system and any default user settings in the registry of the computing device before the operating system upgrade. Below the password entry field 104 is a password recovery or reset selection 106 providing a link to further actions to recover or reset the user's password if forgotten using other verification methods (e.g., question challenges for which the user has provided the answer).

In addition to the familiar password entry field 104, several additional sign-in options may also be presented in the graphical user interface 102 as available for use. These options might be new or somewhat unfamiliar to Jane Doe. Such sign-in options can include, for example, a facial recognition option 112 if the computing device is equipped with an appropriate camera; a fingerprint recognition option 114 if the computing device 100 is equipped with a fingerprint identification device; a PIN entry option 116; and the password entry option 118, which provides the password entry field 104 as depicted. In this implementation, the password entry option 118 is depicted as an option for sign-in, even though it is presented as the default option, to allow the user to switch back and forth between the options in a familiar, static presentation rather than removing and replacing sign-in options in the interface 102 as different options are selected.

The biometric options may or may not be presented to the user depending upon whether the computing device 100 is equipped with biometric reader devices capable of capturing the required biometric information. Additionally, for a user updating the operating system software on a computing device 100, but wanting the option to use biometric sign-in options, the user will typically have to initially sign-in with a legacy password and then provide reference biometric information (e.g., a facial image capture or a fingerprint capture) for secure storage on the computing device 100 (e.g., in a TPM chip). Once the reference biometric information is stored, the facial recognition option 112 and/or fingerprint recognition option 114 are presented as alternative sign-in options. Similarly, if a PIN has not been previously stored in the computing device 100 for use as a sign-in option, a prompt would be presented to Jane Doe to provide a desired PIN for sign-on using the PIN entry option 116 after first verifying her identity.

Figure 1B:
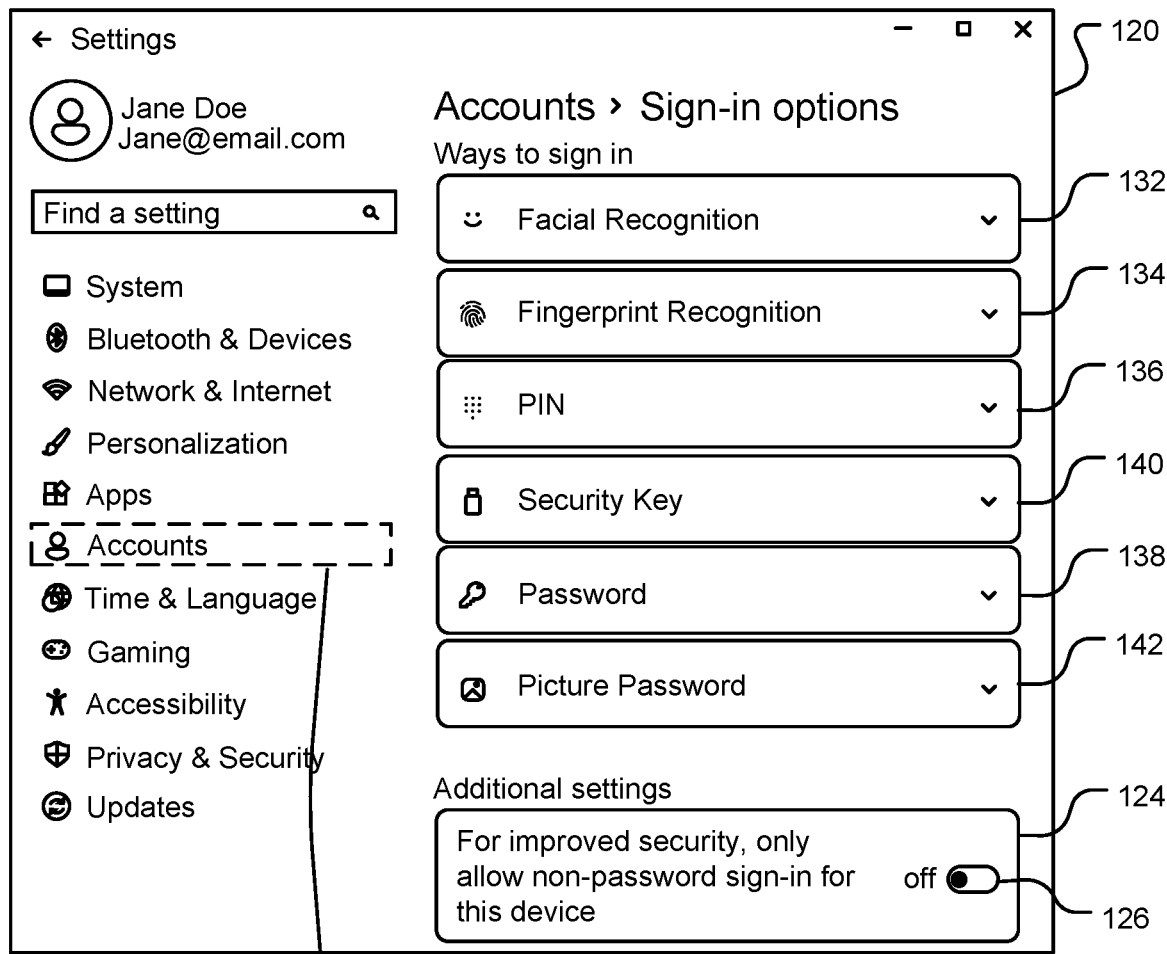
FIG. 1B presents a schematic illustration of an example graphical user interface with a presentation of control settings for sign-in options.

In many computer operating systems, many preferences and options that control the computing environment can be set by the user. FIG. 1B depicts a common device settings interface 120 with a menu of many different system and device settings available for customizable configuration. Many users are often not aware of these device settings options or how to find the device settings interface 120. As depicted, under the accounts section 122, multiple possible sign-in options are presented as potentially available to a user, for example, a facial recognition option 132, a fingerprint recognition option 134, a PIN option 136, a password entry option 138, a security key option 140 (e.g., for highly secure business enterprise computing environments), and a picture password option 142. As previously noted, some of the options may be available only in situations in which the user device includes appropriate equipment, for example, a camera for facial recognition or a fingerprint scanning device. In other implementations, some sign-in options may be activated or deactivated based upon administrator or enterprise settings.

Within the device settings interface 120, the user can choose which sign-in options are presented as available on the sign-in page. For example, a user can choose to deactivate one or more of the sign-in options presented in the device settings interface 120. Thus, if the picture password sign-in option 142 is deactivated, it would not appear as an option on the graphical user interface 102 as a sign-in option, which is the case presented in FIG. 1A. Alternatively, the user could select a non-password option such as the facial recognition option 132, the fingerprint recognition option 134, or the PIN option 136 to be presented as sign-in options or as default sign-in options. Additionally, the user can change settings for the options. For example, the user can select the password entry option 138 and update the password for the user device. Similarly, a user could select the picture password option 142 and update a password picture to be chosen from a collage of pictures or update a finger-swipe drawing that would be accepted as a password.

An additional security setting option 124 is presented in the device settings interface of FIG. 1B, which allows a user to upgrade the security of the computing device 100 by presenting only non-password sign-in options for accessing the computing device 100. If the toggle button 126 is moved to a "On" position, both the password entry option 138 and the picture password option 142 will be deactivated in response and will not appear as a sign-in option on the graphical user interface 102 of the computing device 100.

Until the user changes the toggle button 126 of the additional security setting option 124, the password entry option 118 will continue to be presented as the default sign-in option, for example, if that is the sign-in option preferred by the user based upon past sign-in actions or choices by the user. However, as previously noted, the user may not be aware of the device settings interface 120 or the option to improve security of the computing device 100 by selecting non-password sign-in options. This may be problematic if a goal of the operating system update is to ensure it is providing the best security possible to avoid more significant downstream security breaches. However, a competing goal could be to provide a computing experience to the user that minimizes user interruptions and "friction," e.g., an experience that remains simple and comfortable, even in the context of feature changes and upgrades.

In order to promote user adoption of improved software features (in this example, migrating user sign-in options to more secure alternatives) while minimizing user interruption and friction to reach such adoption, it may be desirable to continue to provide the user the option of selecting a known, familiar feature (in this case password sign-in), while at the same time presenting other software feature options for selection. In addition to presenting the new or alternative software feature options, user education about the benefits of the new features can occasionally be provided. For example, in the context of the lock-screen graphical user interface 102 of FIG. 1A, a message can be presented to encourage the user to use the alternative sign-in methods and note that these other options are more secure. User habits can then be monitored over time and, if a determination is made that a user is expected to embrace the new feature based upon changed habits, the operating system or application can make the desired feature default and remove options to use the less desired feature from presentation to the user. Such changes to settings preferences can be made by the operating system or application after initial installation of the software upgrade and without any direct or overt action by the user to manually change a settings preference. This is in contrast to typical upgrades that force the change to an option or preference on a user without notice; in the user experience, the prior feature or functionality disappears and the change can disorient and frustrate the user. The goal of the system and methodology disclosed herein is to make such a change or migration to new features or functionality only when it appears that the user would likely be comfortable with the change.

Figure 2A:
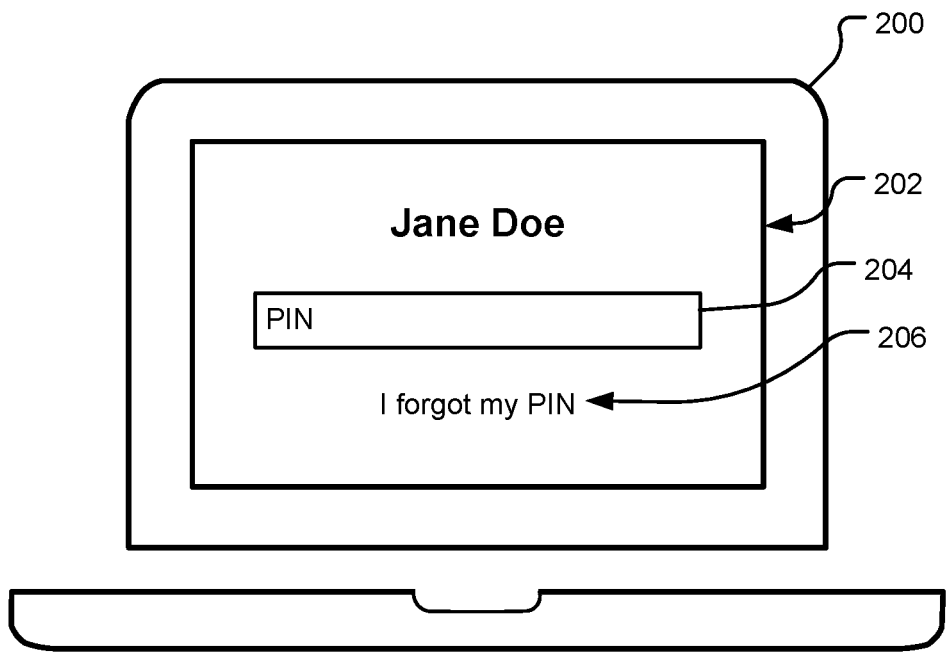
FIG. 2A presents a schematic illustration of an example graphical user interface with a presentation of preferred, reduced, sign-in options after background migration.
Figure 2B:
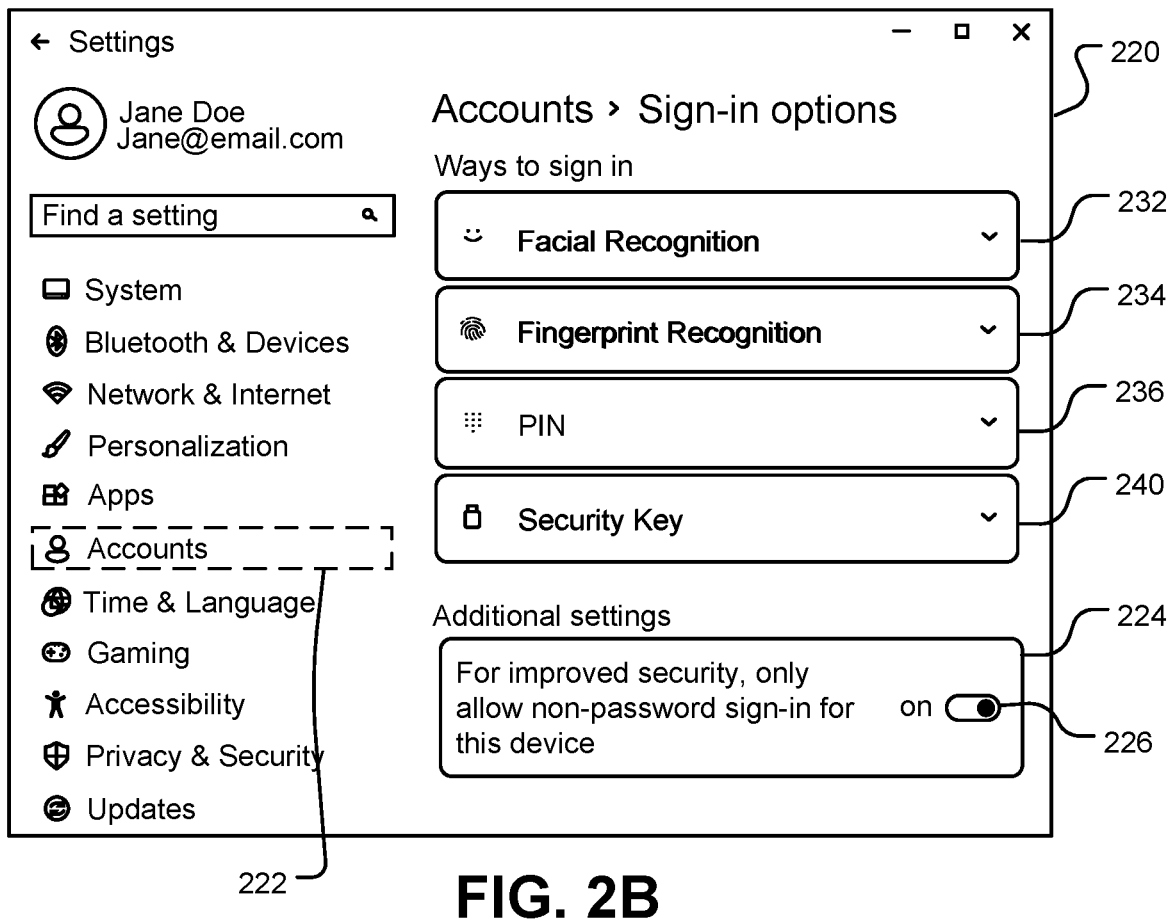
FIG. 2B presents a schematic illustration of an example graphical user interface with a presentation of control settings for sign-in options after background migration.

FIGS. 2A and 2B extend such an example of feature migration in the context of sign-in options previously discussed with respect to FIGS. 1A and 1B. For the purposes of this example, presume that user Jane Doe has decided to regularly use the PIN sign-in option to access her computing device 200. Her usage has been tracked locally on her computing device 200 for a time period that meets a threshold of reasonable certainty that Jane Doe would not be upset if other sign-in options were no longer available to her. In the example of FIG. 2A, the lock-screen graphical user interface 202 on the computing device 200 for user Jane Doe provides only a PIN sign-in entry field 204. The only additional option presented to Jane Doe is a link 206 to reach alternative secure sign-in options (e.g., facial recognition if a camera is associated with the computing device 200) or an opportunity to recover her PIN in the event that she has forgotten her PIN. None of the other sign-in options previously presented to Jane Doe on the lock-screen graphical user interface 202, such as password sign-in, facial recognition, or fingerprint recognition, are presented after migration. Alternatively, multiple sign-in options could still be presented, with removal of only the less secure sign-in options, e.g., those involving passwords that are no longer being used.

In this example, Jane has not taken any affirmative action to change the nature of the lock screen graphical user interface 202 for the available sign-in options, but rather the options have been automatically changed to her preferred secure sign-in option, e.g., PIN sign-in, based upon her regular primary use of that sign-in option over a sufficient period of time. If Jane had preferred to use one of the alternate secure sign-in options, e.g., facial recognition or fingerprint recognition, these options could have been presented as the primary, secure sign-in option to Jane after completion of the background migration process. In some implementations, if Jane successfully signs in using any or multiple of the options from the class of strong authentication mechanisms, such as face recognition, fingerprint recognition, or PIN, the weaker password authentication mechanisms can be automatically removed as options, leaving a choice between the strong authentication mechanisms with which to sign in. In further implementations, if Jane successfully signs in using any or multiple of the options from the class of strong authentication mechanisms, such as face recognition, fingerprint recognition, or PIN, the strong authentication mechanisms used are presented as sign-in options.

To effect this background migration of the feature update, one or more applications operating in the background and collect necessary usage data and compare such usage data to behavioral models to determine whether migration to a new secure login feature is appropriate. The result of such a determination to migrate Jane Doe's sign-in preference is reflected in the device settings interface 220 of FIG. 2B. Under the accounts section 222, a reduced number of possible sign-in options are presented as available. The additional security setting option 224 is presented with the toggle button 226 is moved to the "On" position, which upgrades the security of the computing device 200 by presenting only non-password sign-in options for accessing the computing device 200. The selection of the "On" position of the toggle button was not manually performed by Jane Doe. Rather, the one or more applications implementing the feature migration update changed the registry value for this setting in the background. Notably, neither password option is presented as an available sign-in alternative on either the lock screen graphical user interface 202 or in the device settings interface 220; only the more secure methods of the facial recognition option 232, the fingerprint recognition option 234, the PIN option 236, and the security key option 240 are available for altering user preferences.

A methodology for implementing such a frictionless upgrade migration uses a model developed with extensive machine learning heuristics in combination with local applications running in the background on a computing device to collect user feature usage data and implement migration adjustments. The method identifies characteristics of a population of existing users that can be classified as satisfied users of a feature upgrade and uses this information to identify and automatically migrate other users that are likely to accept the feature upgrade. For the purposes of this method, a "satisfied" user can be understood as a user that has migrated to a feature upgrade, e.g., by regularly choosing the feature upgrade from among options (including the prior version of the feature), permanently switching to the feature upgrade, or continuing the use the feature upgrade option after being automatically switched to the feature upgrade (rather than changing settings to return to the prior version of the feature). Machine learning algorithms implemented on a remote data processing computer, e.g., a data server computer or a mainframe computer, operate on a dataset of usage information from the existing users ("external telemetry data") may be employed to determine the profile of a good background update migration candidate and build a model for comparison with individual user actions. The completed model may be downloaded and saved to the computing device of the user, for example, as part of a software or operating system update.

An algorithm executing on the computing device of the user may consider locally collected user data related to usage of new features and compare such data to the model built by the machine learning algorithm to determine whether permanent feature migration would likely be accepted by the user. For example, in context of secure password migration considered above, data such as number of successful sign-ins after enabling non-password sign-in options; selection of each type of sign-in option; whether the user uses a sign-in after the option is made available; and whether the user turns off any non-password sign-in options in settings preferences after enablement could be compared to model data to determine whether to remove password sign-in as an option. In an alternative embodiment, the collected user data could be sent to a remote computer, e.g., over the Internet to a server computer, for comparison to the model remotely, rather than on the computing device of the user.

In an example implementation, data related to feature use may be collected (e.g., over the Internet) from a large number of computer users, e.g., users who have opted-in to anonymous data collection by operating system or application developers for the purpose of identifying software problems. The collected data is stored in a database managed by the software developer of the upgraded feature. A machine learning model is constructed to process the data to determine one or more profiles for good candidates for background migration of a feature update. In one example implementation, the machine learning algorithm can employ gradient boosted trees to consider the data and build a model for determination of good migration candidates. A good migration candidate can be a user whose profile closely matches a model profile of a satisfied user of the upgraded feature, e.g., a calculated total of valued or weighted aspects of the user profile exceeds a threshold value of a modeled profile of satisfied users. The population of users providing anonymous data can be dynamic (e.g., users that have already migrated to the feature update can continue to be sources of new data, for example, to consider instances in which users revert to the prior feature, while users opted-in to data-collection and who are exposed to the feature upgrade later in time can also be sources of new data) such that the model can be trained and updated multiple times.

Part of the dataset provided to the machine learning algorithm can be collected to identify profiles of users to correlate with the feature use information. For example, the following types of device information can be collected: computing device manufacturer; computing device model; number of processor cores; total RAM; processor clock speed; processor manufacturer name; processor identifier; disk type; available disk space; device family; TPM version; TPM manufacturer; form factor (e.g., laptop, desktop, tablet); operating system (OS) (e.g., Windows® or LINUX®); OS architecture; OS edition; secure boot state of the computing device; and other states or hardware configurations. Such computing device hardware and state information can be used to create part of a profile of a user. For example, computing devices with newer/faster chips, greater memory, and updated OS software could be associated with highly experienced computer users performing significant processing tasks. Alternatively, computing devices that are older, have slower processors, minimum memory, and OS software that is not the current version can be associated with less sophisticated computer users who are less likely to understand how to configure preferences and settings on their computing device.

Another part of the dataset provided to the machine learning algorithm can be external telemetry data collected from multiple users to identify actual user behavioral actions and experiences when presented with a feature upgrade alternative. Profiles of users who are likely to be satisfied when migrating to the new feature can be developed from an analysis of the external telemetry data representing their behavioral actions over time when presented with the option of the feature upgrade. For example, returning to the scenario of migration from a less secure password sign-in paradigm to a more secure, non-password sign-in paradigm, telemetry data tracking several user behavioral actions over time can be instructive in a machine learning model for determining good candidates for background migration. Example telemetry actions for collection can include the following: the number of successful authorizations/sign-ins after enabling non-password sign-in options; credential used (e.g., PIN, face recognition, fingerprint recognition, password); tracking clicks of alternate "sign-in options" rather than the primary or legacy option; tracking switching from a password method of sign-in; tracking whether users sign-in at all after feature enablement; number of sign-in attempts over a defined period of time (e.g., days); from the sign-in attempts, number of unlocks, number of logons; number of sign-in attempts using each method of sign-in (e.g., password, picture password, face identification, fingerprint identification, PIN, other) over the defined period of time: providers used; number of sign-in errors over the defined period of time (e.g., errors due to wrong PIN, errors due to disabled account, errors due to network, errors due to "status logon failure"); percentage combinations of such attempts and errors; and other similar user data.

Some computing devices can be operated by multiple users with separate sign-in credentials that are associated with separate stored user profiles and configuration preferences. When a different user signs in on the computing device, that user's profile is accessed to configure the computing environment according to that user's preferences. Thus, the computing environment or experience for user A may be different than the computing environment or experience for user B on the same computing device. If separate preferences are stored for different users, then the background feature migration methods described herein can be implemented individually for each user of the computing device.

However, some features of the computing device may be global and not able to be set according to individual user preferences. As a simple example, in the context of a sign-in screen, user A primarily uses a password to sign-in, but user B has decided to try the PIN sign-in option presented. In implementations where the sign-in interface is presented identically to all users (e.g., the computing device does not "know" which user is accessing the computing device until sign-in credentials are presented), it can be desirable to combine sign-in feature use data for all users of the computing device and make predictions across all of the users. In this example, the background migration to the updated feature is not implemented until the corresponding model indicates that all of the users of the computing device are likely good candidates for the background migration of the feature.

Once a model is built and trained by the machine learning algorithm using external telemetry data, a copy of the model may be deployed to individual computing devices as part of an application or operating system update with the new or updated feature. Additional software components may also be deployed to the user computing device that may work together to complete the migration to the new or updated feature while deactivating access to the old version of the feature. In some implementations, the software components can harness standard operating system resources to collect user telemetry data and process such collected data through the model to determine whether the user is a good candidate for background migration to the updated feature.

Figure 3:
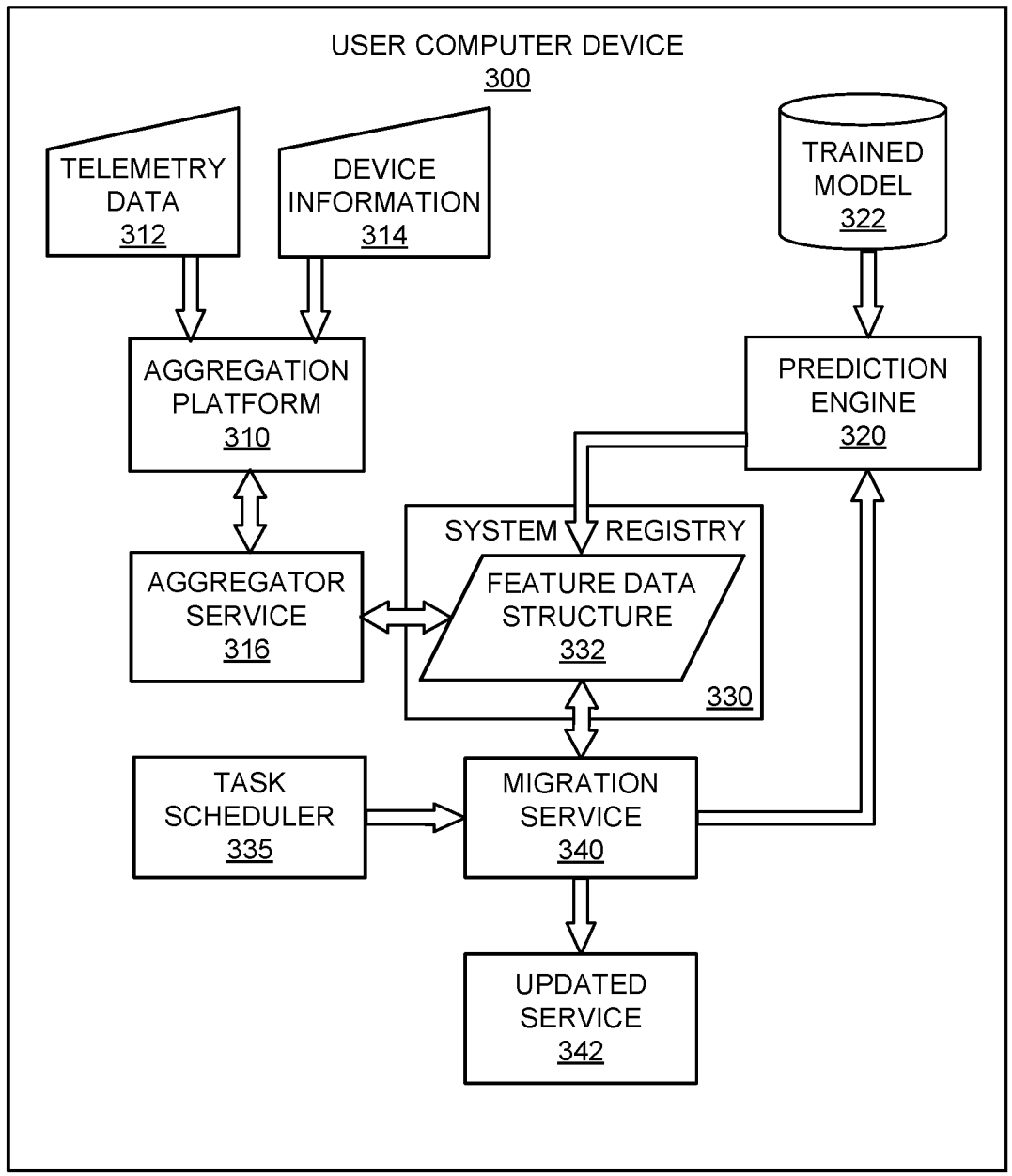
FIG. 3 presents a schematic illustration of an example logical system for implementing a background update migration process on a user computing device.

An example configuration of logical components provided on a computing device 300 for determining whether the user is a good candidate for background migration to the updated feature is depicted schematically in FIG. 3. The logical components can be understood as software modules stored in memory and executed in cooperation with each other by the processor of the computing device 300. A first logical component in this example implementation is an aggregation platform 310 that aggregates telemetry data 312 corresponding to user interactions with the user computing device 300 and device profile information 314, e.g., the hardware component types and configurations of the computing device 300 and states thereof. An aggregator service component 316 can be deployed on the user computing device 300 to configure the aggregation platform 310 to ingest the telemetry data 312 related to user interactions specifically with an optional feature update presented in conjunction with an option to use a prior version of the feature. As noted, the prior version of the feature can be presented as a default option to avoid instant friction in the user experience. The aggregation platform 310 can also ingest device profile information 314 for the computing device 300 as described above for use in creating a robust profile of the user of the computing device 300.

In the example context of a desired feature migration from password sign-in to non-password sign-in, the aggregation platform 310 may be configured by the aggregator service component 316 to collect telemetry data 312 related to user sign-in activity, such as described above. In one example, the aggregation platform 310 may be operable to collect data related to sign-in (e.g., daily) for a predetermined period. For example, time periods of 7, 14, 21, and 28 days may be collected for consideration by the model. The period selected would be the minimum number of days of data necessary for collection before a determination of whether to migrate the software feature option for the user may be made. In one example implementation, data aggregation continues daily beyond an initial period such that a current window of data is maintained, e.g., old data may be purged once a retention period has passed. Such a construct may be desirable when considering whether to background migrate a user. The data inputs to the model would thus represent the user's most recent behavior and not be skewed by old behaviors, such that the determination would be made when the user has likely comfortably adopted the desired feature update on their own.

The aggregator service component 316 may thus reaggregate the data received from the aggregation platform 310 multiple times (e.g., daily or weekly) as old events are continuously removed and replaced by new ones. In this way, the telemetry data 312 and device information 314 collected by the aggregation platform 310 will include the most current user data. The aggregator service component 316 may communicate telemetry data 312 associated with user interactions with the migrating feature, and device information 314, which may provide profile information about the user ingested by the aggregation platform 310. The aggregator service component 316 may store the telemetry data 312 related to the feature and device profile information 314 within a feature data structure 332, e.g., in the system registry 330 of the computing device 300, to coordinate and associate the telemetry data with the user. In addition, in a situation in which the computing device 300 is operated by multiple users with different logins, the feature data structure 332 may be configured to identify which user is using the computing device 300 at a particular time and the associate the telemetry data in the feature data structure with each discrete user. For example, each user of the computing device 300 may have a unique Security Identifier (SID) that the system registry 330 can use to track usage patterns for multiple concurrent users of the computing device 300.

A second logical component for making a background migration determination may be a prediction engine 320. The prediction engine 320 may be operable to interact with a trained model 322 that provides the characteristics of users likely to comfortably migrate to an updated feature without desire to seek or return to a prior implementation of the feature. The prediction engine 320 may also ingest the aggregated user telemetry data from the feature data structure 332 and process the user telemetry data 312 from computing device 300 through the trained model 322 to determine a likelihood that the user is a good candidate for background migration to exclusive use of the updated feature. The prediction engine 320 may compare both device profile information 314, e.g., based, at least in part, upon the hardware configuration of the user's computing device 300, as well as telemetry data 312 of user interactions with the software feature options, e.g., the legacy implementation and the updated implementation. The prediction engine 320 may score the likelihood of a positive migration experience for each user of the computing device 300 based, at least in part, upon the aggregated device information 314 and telemetry data 312 from the feature data structure 332 processed by the prediction engine 320 using the trained model 322. The score may be stored in the feature data structure 332 in the system registry 330 associated with the user or, alternatively, immediately passed to a migration service 340 for further use as described below.

A task scheduler component 335 may be provided to periodically initiate a migration service 340 to undertake a determination of whether the user is a good candidate for background migration to the updated feature. For example, the task scheduler component 335 may be operable to initiate the mitigation service 340 at the conclusion of an aggregation time period, for example, a time period of 7, 14, 21, or 28 days. The migration service 340 may initiate the prediction engine 320 to ingest the user telemetry data 312 and device profile data 314 in the feature data structure 332 and process the data using the trained model 322. If the score computed by the prediction engine 320 exceeds a threshold indicating the user is a good candidate for migration, the migration service 340 will automatically, as a background operation, configure an updated service 342 by changing any appropriate system preferences to provide only the updated feature option to the user and decommission the prior or legacy feature option.

As noted, for multiple users, the aggregator service component 316 may create a feature data structure 332 for each user of the computing device 300 for storage in the system registry 330. The prediction engine 320 accesses the system registry 330 to fetch the aggregate feature data structures 332 of each user and feeds the trained model 322 to evaluate each user. In the case of multiple users of the computing device 300, the migration service 340 may be configured to migrate to an updated service 342 and decommission the prior or legacy feature option only if the scores for all users computed by the prediction engine 320 exceed the threshold indicating all the users are a good candidates for migration, The migration service 340 may also monitor the system registry 330 to determine whether a user has manually reset the feature once migrated to the updated option by the migration service 340. If the value in the system registry 330 corresponding to the status of the feature option changes to indicate a manual reset of the background migration to the updated feature option, such would suggest that the user does not want the software feature options to be limited to only the new or updated feature. In such a circumstance, the migrations service 340 may change an internal setting to prevent it from attempting a background migration of the feature in the future, even if the actual actions of the user might continue to suggest otherwise.

Figure 4:
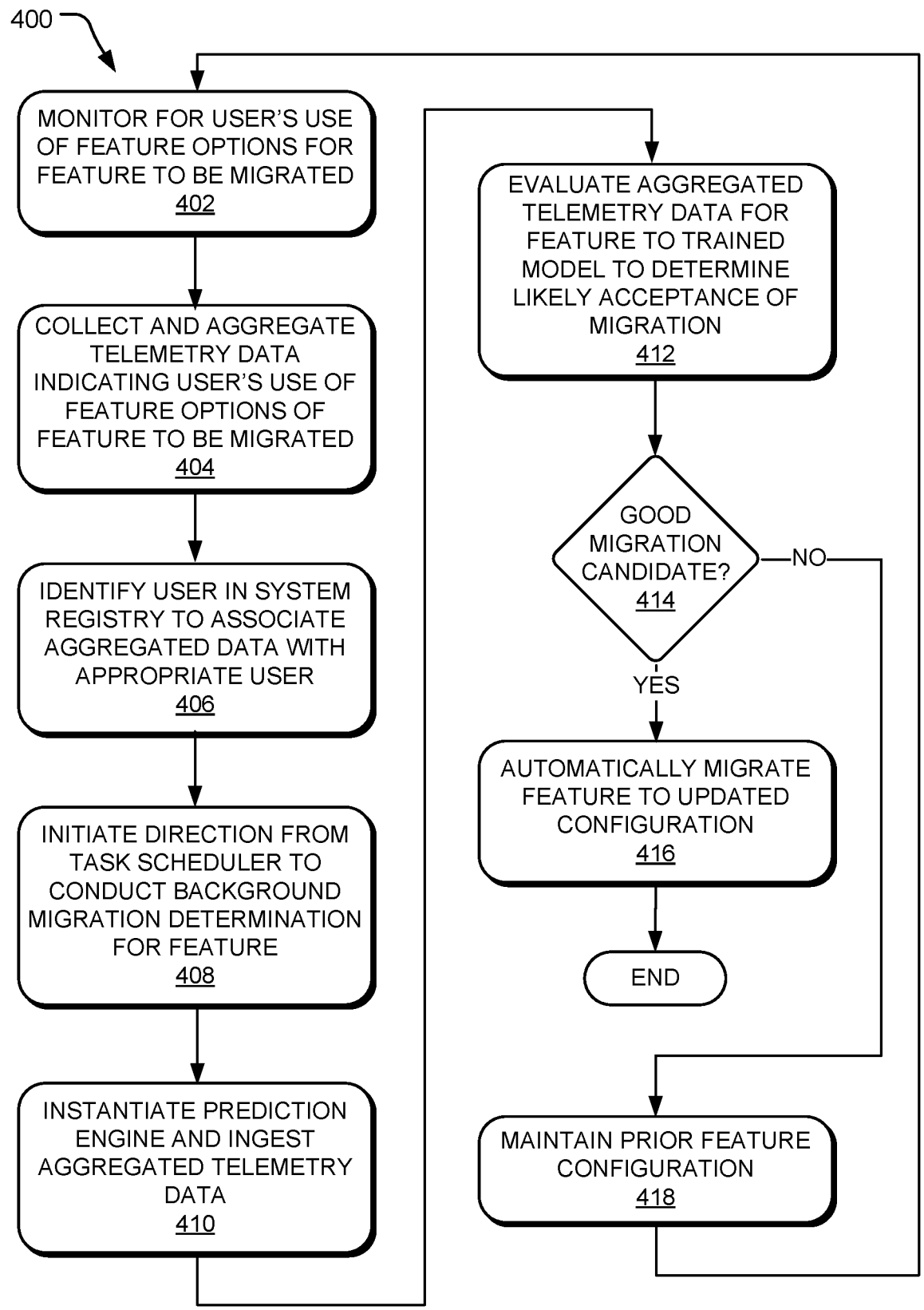
FIG. 4 presents a flow diagram of an example method for implementing a background update migration process on a user computing device.

FIG. 4 depicts an algorithm 400 for determining whether to automatically migrate a feature to an updated feature option based, at least in part, upon a user's habits with respect to the feature over a period of time. In one example implementation, the algorithm 400 is performed by the combination of components described above with respect to FIG. 3. In a monitoring operation 402, the algorithm may monitor and identify the user's use of software feature options (e.g., legacy or updated options) within the feature to be migrated over an extended period of time. In a collecting operation 404, the user's use of such feature options may be collected, stored, and aggregated as telemetry data for determining whether to migrate the feature from a legacy option to an updated option. In an identifying operation 406, the system registry may be consulted to identify the user using the feature such that the telemetry data may be as associated with each user of the computing device. As previously discussed, multiple users may use the same computing device and it may be appropriate to keep track of feature usage for each user to either perform separate migration determinations or wait until all users have reached a point of updated feature option usage to support a migration rather than skewing the habits of multiple users based upon averaging data across all users.

Next, per a scheduled directing operation 408, the task scheduler may direct a migration determination to be made in view of the aggregated telemetry data to determine whether background migration for a feature is appropriate. The task scheduler may be set to perform the directing operation regularly after set periods (e.g., days or weeks) to ensure that adequate telemetry data is available to inform a migration determination. Pursuant to the scheduled directing operation 408, in an instantiation operation 410, a prediction engine may be instantiated and ingest the aggregated telemetry data from the use of the feature. In an evaluation operation 412, the prediction engine may process the telemetry data (e.g., for the use of the software feature options and the type of user) utilizing a trained model to determine likely acceptance of background migration to the updated feature by the user.

In a query operation 414, the algorithm may compare a calculated migration acceptance value of the likelihood of migration acceptance to a threshold based, at least in part, upon the trained model of satisfied users. If the user is considered a good candidate for migration, then the algorithm may proceed to a migration operation 416 in which the feature is automatically migrated in the background to present (e.g., solely or primarily) the updated feature option for future use. However, if it is determined in the query operation 414 that the user is not a good candidate for migration, the status quo of providing the prior or legacy feature option is maintained and the algorithm returns to monitoring operation 402 to continue to aggregate telemetry data for future migration determinations. Prior telemetry data outside a time window, e.g., collected earlier than a time period corresponding to a length of the set period at which the task scheduler is triggered, may be discarded and replaced with currently collected data (e.g., on a first-in, first-out basis) such that further cycles through the algorithm 400 make determinations on telemetry data that is indicative of recent actions and habits of the user rather than historical tendencies.

Figure 5:
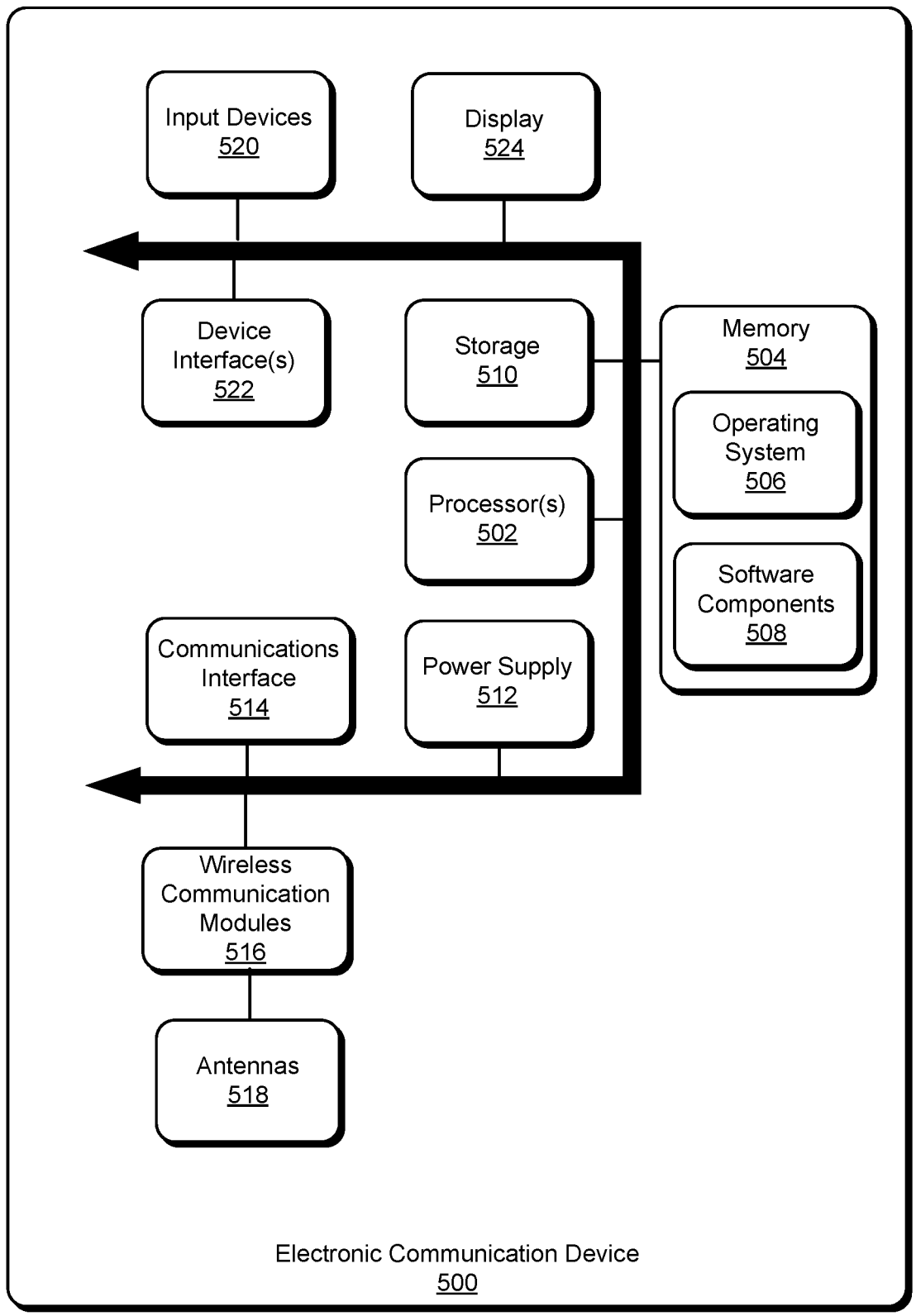
FIG. 5 provides a schematic illustration of an example of a computing device on which a background update migration process can be implemented.

FIG. 5 illustrates an example computing device 500 for implementing the features and operations of the described technology. The computing device 500 can include any network-connected and/or network-capable device and may be a client device, such as a laptop computer, a mobile telephone device, a desktop computer, a tablet computer; a server/cloud computing device; a television; an electronic accessory, e.g., a video gaming device; or another electronic computing device with communication capabilities.

The computing device 500 includes one or more processor(s) 502, a memory 504, and one or more storage devices 510. The memory 504 generally includes both volatile memory (e.g., RAM) and nonvolatile memory (e.g., flash memory). An operating system 506 is instantiated in the memory 504 and is executed by the processor(s) 502. The computing device 500 includes a power supply 512, which is powered by one or more batteries or other power storage sources and provides power to other components of the computing device 500. The power supply 512 may also be connected to an external power source that overrides or recharges the batteries or other power sources.

The storage devices 510 of the computing device 500 may include a variety of tangible processor-readable storage media. Tangible processor-readable storage can be any available media accessible by the computing device 500 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes random access memory (RAM), read only memory (ROM), electrically erasable programmable read-only memory (EEPROM), flash memory or other memory technology, compact disc read only memory (CDROM), digital versatile disks (DVD) or other optical disk storage, magnetic cassettes, magnetic tape, magnetic disk storage, or other magnetic storage devices, or any other tangible medium which can be used to store the desired information and which can be accessed by the computing device 500.

In an example computing device 500, as shown in FIG. 5, one or more software components 508, such as firmware, software applications, instruction modules, communications interface drivers, peripheral drivers, etc., are stored in the memory 504 and/or on the storage device 510, may be instantiated by the operating system 506 and executed by processor(s) 502. Exemplary software applications may include electronic mail programs, scheduling programs, personal information management programs, word processing programs, spreadsheet programs, Internet browser programs, music file management programs, and photograph and video file management programs. The storage device 510 may include one or more tangible storage media devices and may store data used by application software, for example, the telemetry data and the trained model, and further include locally and globally unique identifiers, requests, responses, and other data which may be local to the computing device 500 or which may be remote and communicatively connected to the computing device 500.

Various software components 508, for example, the aggregation platform, the service aggregator, the task scheduler, the migration service, and the prediction engine described herein may be executable by the one or more processors 502, which may include logic machines configured to execute hardware or firmware instructions. For example, the processors 502 may be operable to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors 502 and memory 504 may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe one or more of a hardware component, a software process, or a combination of both, implemented to perform a particular function. It will be understood that different modules, programs, and/or engines may be instantiated from the same application, service, code block, object, library, routine, script, application program interface (API), function, etc. Likewise, the same module, program, and/or engine may be instantiated by different applications, services, code blocks, objects, routines, APIs, functions, etc. When incorporating software, the terms "module," "program," and "engine" may encompass individual or groups of executable files, data files, libraries, drivers, scripts, database records, etc. It may be appreciated that a "service," as used herein, is an application program executable across one or multiple user sessions. A service may be available to one or more system components, programs, and/or other services. In some implementations, a service runs on one or more server computing devices.

The computing device 500 may include a communications interface 514 (e.g., a network adapter) that manages one or more wireless communication circuitry 516 for establishing connections over a wide-area network (WAN) or local-area network (LAN), for example, ethernet ports, wireless transmitters, wireless receivers, or transceivers (i.e., a combined transmitter and receiver), which may be connected to one or more antenna(s) 518 to provide network connectivity (e.g., to mobile phone networks such as LTE and 5G, Wi-Fi®, GPS, Bluetooth®, Near Field Sensing) or to one or more other devices on a network (e.g., mobile devices, desktop computers, laptop computers, or servers). In some embodiments, multiple wireless communication circuitry 516 and antennas 518 may be employed to communicate incoming and outgoing radiofrequency carrier signals on various different frequency bandwidths and utilize different communication protocols. It should be appreciated that the network connections shown are examples and that other computing devices and structures and protocols for establishing a communications link between the computing device 500 and other devices may be used.

The communications interface 514 may provide for transmission of intangible processor-readable communication signals. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include signals traveling through wired media such as a wired network or direct-wired connection, and wireless media such as acoustic, RF, infrared, and other wireless media.

The computing device 500 may include one or more input devices 520 such that a user may enter commands and information (e.g., a touchscreen interface, a keyboard, a mouse, a microphone). These and other input devices may be coupled to other internal components or modules by one or more device interfaces 522, such as a serial port interface, parallel port, or universal serial bus (USB). The computing device 500 may further include a display device 524, such as an LCD display or an LED display, which may be separate components or may be integrated displays within a touchscreen interface. If a touchscreen interface is provided as an integration of an input device 520 and a display device 524, software code may be provided with the computing device 500 to adaptively determine noise levels affecting a digitizer component of the touchscreen interface caused by the integrated display device 524 and other electrical components to allow for improved noise removal and better touch signal identification by the touchscreen interface.

By leveraging a machine learning model, the disclosed system and method automate the process of finding a "good candidate" (as described below) for upgrading a feature to a new, preferred option without relying on explicit user opt-in. This technique may be a more effective option to other methods of user engagement, including advertisement or relying on users to manually seek out a feature on their own. By using an accurate machine learning model tuned for a particular feature migration scenario, users may more effectively be moved toward use of a feature upgrade without causing interruption, consternation, or friction that may arise with immediate discontinuation of a familiar legacy feature implementation.

Additionally, by installing the previously trained model on the computing device, maintaining all user telemetry data on the computing device, and calculating the migration determination on the user device, even users who opt out of sharing non-personally-identifiable information with a software developer may be slowly acclimated to acceptance of the updated feature option without sending any information to a third party. User data security and privacy concerns can be fully accommodated with this migration implementation.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features are sometimes described above as acting in certain combinations and even initially claimed as such, one or more features from a claimed combination can in some cases be excised from the combination, and the claimed combination can be directed to a sub-combination or variation of a sub-combination.

In one example implementation, a method of migrating a user profile of a computing device to an updated version of a software feature to exclusion of a prior version of the software feature includes the following operations. Telemetry data corresponding to use of the updated version of the software feature and to use of the prior version of the software feature is stored. The telemetry data is evaluated utilizing a trained machine learning model trained using external telemetry data with respect to use of the updated version of the software feature and to use of the prior version of the software feature. Based, at least in part, upon the evaluating of the telemetry data utilizing the trained machine learning model, a migration acceptance value of the user profile is calculated. The migration acceptance value is compared to a threshold value determined by the trained machine learning model. Responsive to the migration acceptance value exceeding the threshold value, the prior version of the software feature is excluded from use by the user profile.

In a related example implementation, the migration acceptance value is indicative of whether a user corresponding to the user profile will accept use of the updated version of the software feature on the computing device to exclusion of the prior version of the software feature.

In a related example implementation, the method further includes aggregating the telemetry data over a period of time before the evaluating the telemetry data.

In a related example implementation, the method further includes, responsive to the migration acceptance value failing to exceed the threshold value, continuing to store telemetry data for a further period of time of aggregation before the evaluating the telemetry data.

In a related example implementation, the method further includes discarding telemetry data collected and stored outside a current window of the period of time.

In a related example implementation, the method further includes performing the method with respect to an alternate user profile associated with the computing device, wherein alternate telemetry data of the alternate user profile is differentiable from the telemetry data of the user profile. The aggregating operation further aggregates the telemetry data the user profile and the alternate telemetry data of the alternate user profile in combination.

In a related example implementation, the telemetry data and the trained machine learning model are stored in memory locally on the computing device.

In a related example implementation, the telemetry data includes device profile information corresponding to the computing device.

In another example implementation, a system for migrating a user profile of a computing device to an updated version of a software feature to exclusion of a prior version of the software feature includes an aggregation platform, a prediction engine, and a migration service, each of which is stored in a memory of the computing device and is executable by a processor of the computing device. The aggregation platform stores telemetry data corresponding to use of the updated version of the software feature and to use of the prior version of the software feature. The prediction engine evaluates the telemetry data utilizing a trained machine learning model trained using external telemetry data with respect to use of the updated version of the software feature and to use of the prior version of the software feature. The prediction engine also calculates, based, at least in part, upon evaluation of the telemetry data utilizing the trained machine learning model, a migration acceptance value of the user profile. The prediction engine further compares the migration acceptance value to a threshold value determined by the trained machine learning model. The migration service is responsive to the migration acceptance value exceeding the threshold value to exclude the prior version of the software feature from use by the user profile.

In a related example implementation, the migration acceptance value is indicative of whether a user corresponding to the user profile will accept use of the updated version of the software feature on the computing device to exclusion of the prior version of the software feature.

In a related example implementation, the aggregation platform aggregates the telemetry data over a period of time before the prediction engine evaluates the telemetry data.

In a related example implementation, responsive to the migration acceptance value failing to exceed the threshold value, the aggregation platform continues to store telemetry data for a further period of time of aggregation before the prediction engine evaluates the telemetry data.

In a related example implementation, the aggregation platform discards telemetry data collected and stored outside a current window of the period of time.

In a related example implementation, the aggregation platform stores alternate telemetry data with respect to an alternate user profile associated with the computing device, wherein the alternate telemetry data of the alternate user profile is differentiable from the telemetry data of the user profile. The aggregation platform further aggregates the telemetry data of the user profile and the alternate telemetry data of the alternate user profile in combination.

In a related example implementation, the telemetry data and the trained machine learning model are stored in memory locally on the computing device.

In a related example implementation, the telemetry data includes device profile information corresponding to the computing device.

In a further example implementation, a tangible processor-readable storage media is embedded with instructions for executing a process on a computing device to migrate a user profile of the computing device to an updated version of a software feature to exclusion of a prior version of the software feature. Telemetry data is stored on the computing device corresponding to use of the updated version of the software feature and to use of the prior version of the software feature. The telemetry data is evaluated utilizing a trained machine learning model trained using external telemetry data with respect to use of the updated version of the software feature and to use of the prior version of the software feature. Based, at least in part, upon the evaluation of the telemetry data utilizing the trained machine learning model, a migration acceptance value of the user profile is calculated. The migration acceptance value is compared to a threshold value determined by the trained machine learning model. Responsive to the migration acceptance value exceeding the threshold value, the prior version of the software feature is excluded from use by the user profile.

In a related example implementation, the migration acceptance value is indicative of whether a user corresponding to the user profile will accept use of the updated version of the software feature on the computing device to exclusion of the prior version of the software feature.

In a related example implementation, the process further includes aggregating the telemetry data over a period of time before the evaluating the telemetry data.

In a related example implementation, responsive to the migration acceptance value failing to exceed the threshold value, the process further includes continuing to store telemetry data for a further period of time of aggregation before the evaluating the telemetry data.

In a related example implementation, the process further includes discarding telemetry data stored outside a current window of the period of time.

In a related example implementation, the telemetry data and the trained machine learning model are stored in memory locally on the computing device.

In a related example implementation, the telemetry data includes device profile information corresponding to the computing device.

The logical operations making up implementations of the technology described herein are alternately referred to variously as operations, steps, objects, or modules. Furthermore, it should be understood that logical operations can be performed in any order, adding or omitting operations as desired, regardless of whether operations are labeled or identified as optional, unless explicitly claimed otherwise or a specific order is inherently necessitated by the claim language. Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. Moreover, the separation of various system components in the implementations described above should not be understood as requiring such separation in all implementations.

The above specification, examples, and data provide a thorough description of the structure and use of exemplary embodiments of the invention as defined in the claims. Although various embodiments of the claimed invention have been described above with a certain degree of particularity or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure can be made without departing from the basic elements of the invention as defined in the following claims.

What is claimed is:

1. A method of migrating a user profile of a computing device to an updated version of a software feature to exclusion of a prior version of the software feature, the method comprising:
   storing telemetry data corresponding to use of the updated version of the software feature and to use of the prior version of the software feature;
   evaluating the telemetry data utilizing a trained machine learning model trained using external telemetry data with respect to use of the updated version of the software feature and to use of the prior version of the software feature;
   calculating, based, at least in part, upon the evaluating of the telemetry data utilizing the trained machine learning model, a migration acceptance value of the user profile;
   comparing the migration acceptance value to a threshold value determined by the trained machine learning model; and
   responsive to the migration acceptance value exceeding the threshold value, excluding the prior version of the software feature from use by the user profile.

2. The method of claim 1 further comprising aggregating the telemetry data over a period of time before the evaluating the telemetry data.

3. The method of claim 2 further comprising, responsive to the migration acceptance value failing to exceed the threshold value, continuing to store telemetry data for a further period of time of aggregation before the evaluating the telemetry data.

4. The method of claim 2 further comprising discarding telemetry data collected and stored outside a current window of the period of time.

5. The method of claim 2 further comprising:
   performing the method with respect to an alternate user profile associated with the computing device, wherein alternate telemetry data of the alternate user profile is differentiable from the telemetry data of the user profile; and
   the aggregating operation aggregates the telemetry data the user profile and the alternate telemetry data of the alternate user profile in combination.

6. The method of claim 1, wherein the telemetry data and the trained machine learning model are stored in memory locally on the computing device.

7. The method of claim 1, wherein the telemetry data includes device profile information corresponding to the computing device.

8. A system for migrating a user profile of a computing device to an updated version of a software feature to exclusion of a prior version of the software feature, the system comprising:
   an aggregation platform stored in a memory of the computing device and executable by a processor of the computing device to store telemetry data corresponding to use of the updated version of the software feature and to use of the prior version of the software feature;
   a prediction engine stored in the memory and executable by the processor to
      evaluate the telemetry data utilizing a trained machine learning model trained using external telemetry data with respect to use of the updated version of the software feature and to use of the prior version of the software feature;

calculate, based, at least in part, upon evaluation of the telemetry data utilizing the trained machine learning model, a migration acceptance value of the user profile; and compare the migration acceptance value to a threshold value determined by the trained machine learning model; and a migration service stored in the memory and executable by the processor to, responsive to the migration acceptance value exceeding the threshold value, exclude the prior version of the software feature from use by the user profile.

9. The system of claim 8, wherein the aggregation platform aggregates the telemetry data over a period of time before the prediction engine evaluates the telemetry data.

10. The system of claim 9, wherein responsive to the migration acceptance value failing to exceed the threshold value, the aggregation platform continues to store telemetry data for a further period of time of aggregation before the prediction engine evaluates the telemetry data.

11. The system of claim 9, wherein the aggregation platform discards telemetry data collected and stored outside a current window of the period of time.

12. The system of claim 9, wherein
the aggregation platform stores alternate telemetry data with respect to an alternate user profile associated with the computing device, wherein the alternate telemetry data of the alternate user profile is differentiable from the telemetry data of the user profile; and
the aggregation platform aggregates the telemetry data of the user profile and the alternate telemetry data of the alternate user profile in combination.

13. The system of claim 8, wherein the telemetry data and the trained machine learning model are stored in memory locally on the computing device.

14. The system of claim 8, wherein the telemetry data includes device profile information corresponding to the computing device.

15. A tangible processor-readable storage media embedded with instructions for executing a process on a computing device to migrate a user profile of the computing device to an updated version of a software feature to exclusion of a prior version of the software feature, the process comprising:

storing telemetry data on the computing device corresponding to use of the updated version of the software feature and to use of the prior version of the software feature;

evaluating the telemetry data utilizing a trained machine learning model trained using external telemetry data with respect to use of the updated version of the software feature and to use of the prior version of the software feature;

calculating, based, at least in part, upon the evaluating of the telemetry data utilizing the trained machine learning model, a migration acceptance value of the user profile;

comparing the migration acceptance value to a threshold value determined by the trained machine learning model; and responsive to the migration acceptance value exceeding the threshold value, excluding the prior version of the software feature from use by the user profile.

16. The tangible processor-readable storage media of claim 15, wherein the process further comprises aggregating the telemetry data over a period of time before the evaluating the telemetry data.

17. The tangible processor-readable storage media of claim 16, wherein the process further comprises, responsive to the migration acceptance value failing to exceed the threshold value, continuing to store telemetry data for a further period of time of aggregation before the evaluating the telemetry data.

18. The tangible processor-readable storage media of claim 16, wherein the process further comprises discarding telemetry data stored outside a current window of the period of time.

19. The tangible processor-readable storage media of claim 15, wherein the telemetry data and the trained machine learning model are stored in memory locally on the computing device.

20. The tangible processor-readable storage media of claim 15, wherein the telemetry data includes device profile information corresponding to the computing device.

* * * * *